United States Patent
Bagley, Jr.

[11] Patent Number: 5,310,204
[45] Date of Patent: May 10, 1994

[54] MODIFIED FIFTH WHEEL TRAILER HITCH AND TRAILER TONGUE CONSTRUCTION

[76] Inventor: Arnold A. Bagley, Jr., 1425 N. 35th St., Milwaukee, Wis. 53208

[21] Appl. No.: 854,713

[22] Filed: Mar. 23, 1992

[51] Int. Cl.$^5$ ............................................... B62D 53/06
[52] U.S. Cl. ................................. 280/415.1; 280/433; 280/491.1
[58] Field of Search ............ 280/415.1, 416.1, 416.3, 280/417.1, 418.1, 433, 438.1, 901, 491.1, 491.4, 491.5, 491.2

[56] References Cited

U.S. PATENT DOCUMENTS

| | | | |
|---|---|---|---|
| 2,238,095 | 4/1941 | Almcrantz | 280/446.1 |
| 3,164,399 | 1/1965 | Lugash | 280/901 X |
| 3,393,922 | 7/1968 | Adams | 280/423 |
| 3,501,169 | 3/1970 | Nutt, Jr. | 280/491.5 |
| 3,698,740 | 10/1972 | Chisholm et al. | 280/491.5 X |
| 3,790,191 | 2/1974 | Gallatin | 280/456 |
| 3,829,129 | 8/1974 | Newcomer | 280/476 |
| 3,865,405 | 2/1975 | Mitchell | 280/476.1 |
| 3,941,407 | 3/1976 | Breford | 280/415.1 |
| 4,397,474 | 8/1983 | Mettetal | 280/423.1 |
| 4,451,066 | 5/1984 | Collins | 280/508 |
| 4,832,358 | 5/1989 | Bull | 280/491.5 X |
| 4,960,288 | 10/1990 | Chambers | 280/423.1 |
| 5,149,122 | 9/1992 | Helber | 280/491.5 |

FOREIGN PATENT DOCUMENTS

| | | | |
|---|---|---|---|
| 3700116 | 7/1988 | Fed. Rep. of Germany | 280/433 |
| 1220929 | 3/1986 | U.S.S.R. | 280/418.1 |

*Primary Examiner*—Margaret A. Focarino
*Assistant Examiner*—Victor E. Johnson
*Attorney, Agent, or Firm*—James A. Wilke

[57] ABSTRACT

A fifth wheel trailer hitch assembly mounted under and attached to a vehicle frame comprising a cradle and king pin adaptor. The trailer hitch assembly attaches to the trailer with the goose-necked trailer tongue king pin adaptors. The king pin of such assembly engages a fifth wheel trailer hitch mounted in the cradle mounted under the towing vehicle. The trailer tongue king pin adaptor may also be hinged to facilitate storage of the adaptor when the trailer is parked.

4 Claims, 2 Drawing Sheets

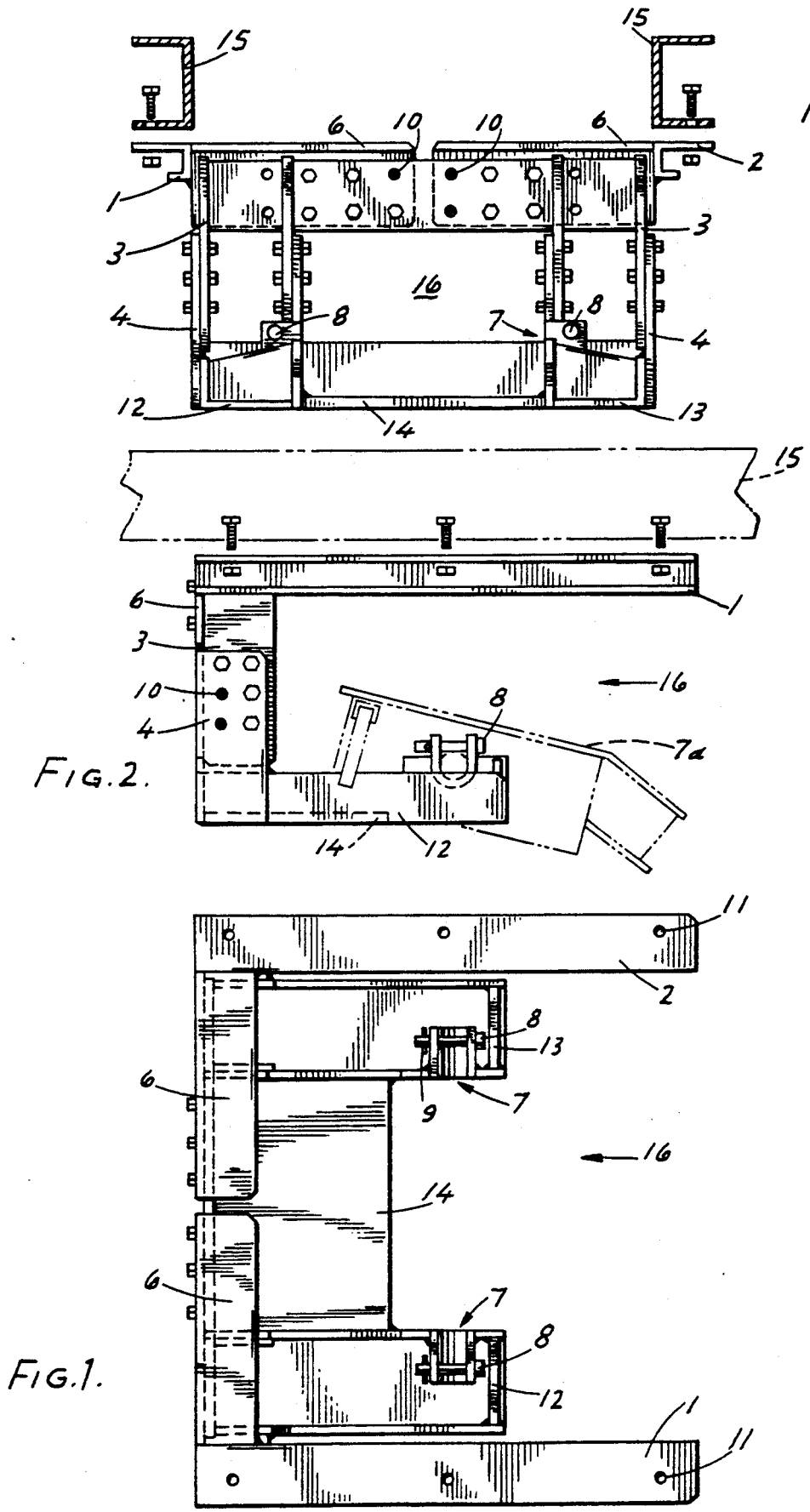

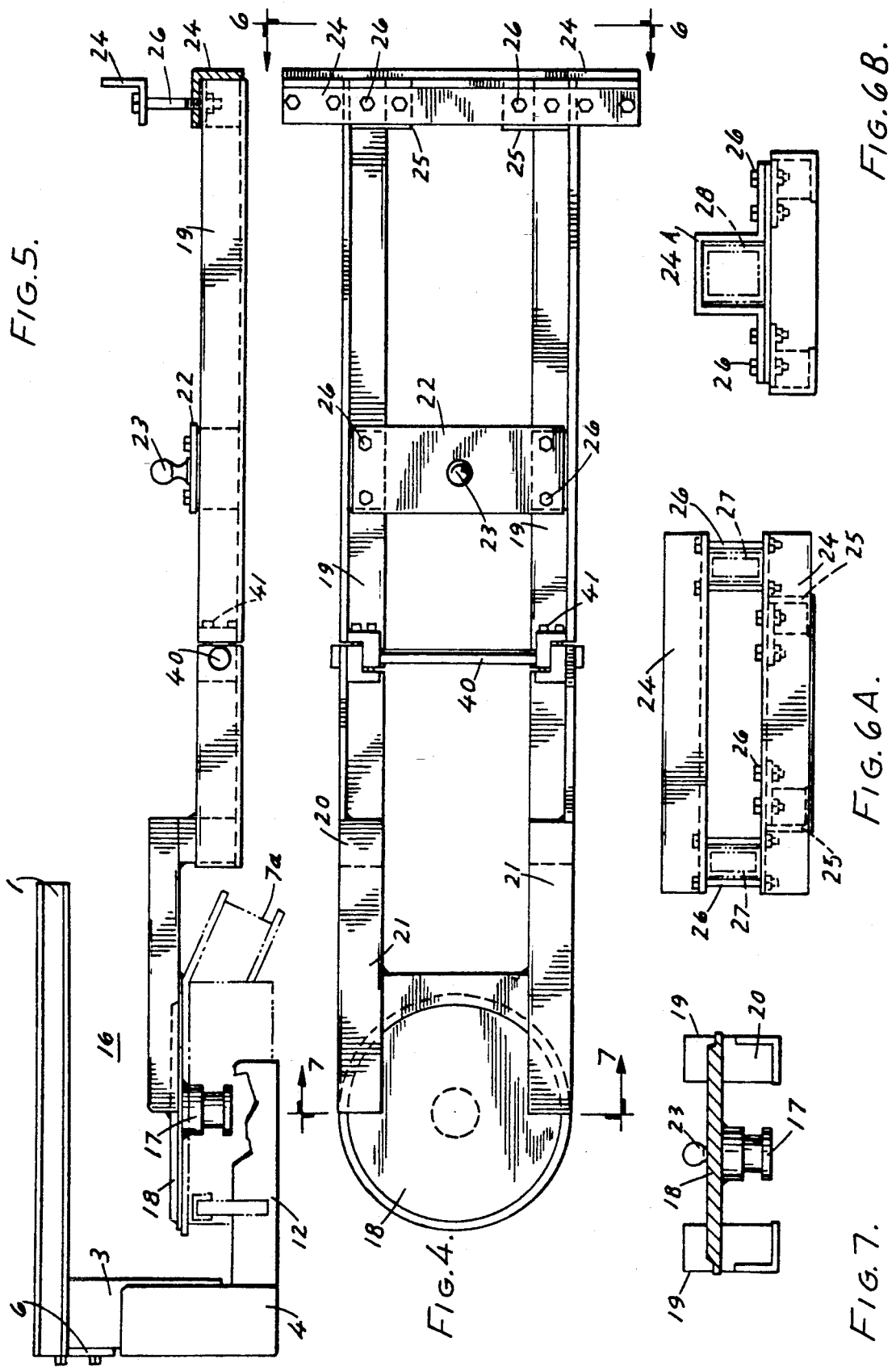

5,310,204

MODIFIED FIFTH WHEEL TRAILER HITCH AND TRAILER TONGUE CONSTRUCTION

FIELD OF THE INVENTION

The invention relates to a fifth wheel trailer hitch assembly. More particularly, the invention relates to a fifth wheel trailer hitch assembly that is mounted under and attached to the frame of the towing vehicle. The trailer hitch assembly couples to the trailer with the invention's goose-necked trailer tongue assembly's king pin.

BACKGROUND OF THE INVENTION

The utilization of a fifth wheel trailer hitch for pulling various towed vehicles, especially recreational trailers, has been suggested in the past. This method has been used on a variety of towing vehicles and is commonly attached to a pick-up truck inside the bed of such vehicle, as disclosed in the U.S. Pat. No. 4,960,288. The major disadvantage of such a method of trailer coupling is that the bed of the pick-up truck cannot be used to its fullest capacity because of the fifth wheel assembly and the space needed to allow the trailer free pivot clearances. Another disadvantage of such prior methodology is that the trailer hitch and trailer tongue must be raised a sufficient distance to couple with the fifth wheel assembly in the truck bed. Such raising usually requires a jack or lift of some kind.

A fifth wheel trailer hitch has also been mounted on the bed of a pick-up truck or on such truck's bumper as shown in U.S. Pat. No. 3,941,407. Other fifth wheel trailer hitch assemblies use a separate dolly between the towing vehicle and the towed vehicle as shown in U.S. Pat. No. 3,865,405 and 3,829,129. The disadvantages of such arrangements are the trailer balance points are harder to equalize, many parts in the assemblies, turning radii are reduced, and multiple-pivot points in the towing axis.

SUMMARY OF THE INVENTION

The general object of the present invention is to maximize the use of the pick-up truck bed while providing the benefits of a fifth wheel trailer hitch.

A cradle constructed of suitable material, such as angle or channel iron, is mounted to the frame of the towing vehicle, typically a pick-up truck but can also be a van or recreational vehicle. The cradle is mounted as close to the drive train differential as possible. The cradle is adjustable as to width between the vehicle frame as well adjustable as to height above the travel surface.

The cradle engages and supports a typical fifth wheel trailer hitch of the type that engages a king pin. The principle benefit of this type of trailer hitch is the safety inherent in the method.

One important aspect of the invention is that the truck bed of the usual towing vehicle is entirely open to use and not involved with the trailer hitch assembly.

Another important aspect of the invention is that in usual operation only one person is needed to couple and uncouple the trailer hitch.

Another aspect of the invention is that a low center of gravity is established with the cradle and king pin assembly being mounted and engaged under the towing vehicle frame.

Another aspect of the invention is that sway of the towed vehicle is greatly minimized by the king pin hitch assembly and yet allows a full 90 degree turning radius left or right in either the forward or backward direction.

Another aspect of the invention is that it can be used with existing straight or A-frame trailer tongues or can be built with the trailer during initial manufacturing.

Another aspect of the invention is that it can be attached to the towing and towed vehicles in such a manner as to allow complete removal of the cradle and king pin adaptor.

Another aspect of the invention is that the king pin adaptor assembly may be hinged in front of the trailer ball attachment to allow a retracted position of the king pin extension portion of the hitch rails when the towed vehicle is in a parked condition and an extended position when the towed vehicle is being towed. In either position the hinge assembly provides a locking means to lock the king pin extension portion in the desired position.

These and other features, aspects, advantages and objects of the invention will become apparent to those of ordinary skill in the art upon review of the following description reference being made to the appended drawings.

BRIEF DESCRIPTION OF THE DRAWING

FIG. 1 Top Plan View of Cradle
FIG. 2 Side Elevation View of Cradle
FIG. 3 End View of Cradle
FIG. 4 Top Plan View of King Pin Adaptor Assembly
FIG. 5 Side Elevation View of King Pin Adaptor Assembly
FIG. 6A Sectional End View of King Pin Adaptor Assembly mounted on an A-Frame Towed Vehicle Tongue. along the line 6—6.
FIG. 6B Section End View of King Pin Adaptor Assembly mounted on a Straight Towed Vehicle Tongue
FIG. 7 Section End View of the King Pin Extension Plate along the line 7—7

Before explaining at least two embodiments of the invention in detail it is to be understood that the invention is not limited in its application to the details of construction and arrangement of the components set forth in the following description or illustrated in the drawings. The invention is capable of other embodiments or being practiced or carried out in various ways. Also it is to be understood that the phraseology and terminology employed herein is for the purpose of description and should not be regarded as limiting.

DETAILED DESCRIPTION OF THE PREFERRED EMBODIMENT OF THE INVENTION

Shown in the various figures is a fifth wheel trailer hitch with the fifth wheel being mounted in a cradle attached to the frame of a towing vehicle and engaged by a King pin mounted on a King pin adaptor assembly attached to the tongue of a towed vehicle.

CRADLE ASSEMBLY

As can be seen in FIGS. 1, 2, and 3, the fifth wheel trailer hitch cradle includes a left (1) and right (2) top channel irons in spaced apart relationship, each providing a plurality of mounting holes (11). Said channel irons are mounted to a vehicle frame (15) by means well known in the art such as welding. The preferred method of mounting is to attach the top channel irons to the vehicle frame with mounting bolts through the mounting holes provided in the top channel irons. Such method of mounting facilitates later removal of the cradle assembly at such time as the towing vehicle is to be disposed of by the owner. The top channel iron members are maintained in spaced apart relationship by means of width adjusting plates (6) mounted to the top channel irons, said plates being provided with adjustment holes (10). The width adjustment plates provide traverse bracing between the top channel irons with the adjustment holes providing a means to accommodate various distances between vehicle frames to which the cradle may be mounted.

Attached to each top channel iron (1) and (2) are an upper adjuster plate (3) and a lower adjuster plate (4), each of which is provided with a plurality of holes (10). The upper and lower adjusting plates provides a means for raising or lowering the fifth wheel coupling device (not shown). Attached to each lower adjusting plate, at a right angle thereto and parallel to the top channels, are channel irons (12) and (13) adapted to mount the fifth wheel trailer hitch using a pivot saddle (7), lock pin (8) and cotter pin (9) assembly on each such channel irons. The fifth wheel trailer hitch assembly and the mounting assembly are well known in the art. A steel plate (14) is mounted to each of the left and right side of the cradle at the inside adjuster plate (5) and the upper (3) and lower (4) adjuster plates. The cradle assembly provides and defines an opening (16) adapted to receive the fifth wheel trailer hitch.

In operation the cradle assembly is mounted to a towing vehicle, preferably behind the rear axle of such vehicle, along and parallel to the vehicle's frame rails. The height of the fifth wheel trailer hitch, above the ground, is adjusted to provide maximum clearance under the circumstances of the terrain to be traveled. The fifth wheel trailer hitch is mounted in the cradle so as to be spaced below the towing vehicle and positioned to accept the king pin adaptor, yet to be described, which is attached to the trailer tongue of the vehicle to be towed.

KING PIN ADAPTOR

The king pin adaptor, as illustrated in FIGS. 4, 5, 6A and 6B, and 7, is attached to the trailer tongue of a vehicle to be towed. The king pin adaptor comprises two formed iron hitch rails (19) maintained in spaced, parallel relationship by the ball plate adjuster (22) and the king pin plate extension (18). The king pin plate extension is mounted to one end each of two channel extension irons (21); the other end of which is welded to one end of each formed iron hitch rail. The channel extension iron (21) and the angle iron hitch rail is joined in a goose neck configuration as shown in FIG. 5 and braced at said junction by a brace member (20) welded to each piece. A king pin (17) is mounted in the center of the king pin plate extension as shown in FIGS. 4, 5, and 7.

The ball plate adjuster (22) having a plurality of mounting holes is bolted to the formed iron hitch rails at a location to facilitate the attachment of the trailer tongue of the towed vehicle. A trailer ball (23) is mounted on the ball plate adjuster.

The king pin adaptor is attached to the trailer tongue of a towed vehicle at the ends of the two formed iron hitch rails, opposite the king pin plate extension, clamping the trailer tongue (27) between two end cap locking brackets (24) using a plurality of bolts (26) and angle brackets (25) if the trailer tongue is of the A-frame construction or by clamping the trailer tongue using an end cap locking bracket (24A) and a plurality of bolts (26) if the trailer tongue is of the straight tongue construction (28).

In use, the king pin adaptor is attached to a trailer tongue of a vehicle to be towed by mounting the trailer ball locking assembly of the towed vehicle on the trailer ball (23) mounted on the king pin adaptor and clamping the king pin adaptor to the trailer tongue thereby forming a three-point attachment configuration. The king pin adaptor is mounted to the towing vehicle by engaging the fifth wheel trailer hitch mounted in the cradle fixed to the towing vehicle with the king pin fixed to the king pin adaptor thus completing the towing vehicle/towed vehicle arrangement.

A second embodiment of the invention provides a hinge 40 and means for locking 41 the hinge in each of the formed iron hitch rails 21 between the ball plate adjustor 22 and the king pin plate extension 18. Such embodiment allows the king pin adaptor to be pivoted to a stowed position, about the hinge, and locked when the king pin adaptor is not being used, such as when the towed vehicle is parked. When in use, the king pin adaptor is locked into the extended position by the means for locking the hinge.

Thus it should be apparent that there has been provided in accordance with the present invention a fifth wheel trailer hitch assembly comprising a cradle and king pin adaptor adapted for attachment to and under a towing vehicle which trailer hitch assembly attaches to the trailer with the invention's goose-necked trailer tongue king pin adaptor's king pin by engaging the fifth wheel trailer hitch mounted in the invention's cradle. Although the invention has been described in conjunction with the specific embodiments thereof, it is evident that many alternatives, modifications and variations will be apparent to those skilled in the art. Accordingly, it is intended to embrace all such alternatives, modifications, and variations that fall within the spirit and broad scope of the appended claims.

I claim:

1. A fifth wheel trailer hitch assembly mounted to a frame of a towing vehicle and a trailer tongue of a trailer and having a trailer ball hitch assembly with said fifth wheel trailer hitch assembly comprising:

a cradle assembly defining an opening for mounting a fifth wheel trailer hitch, said cradle assembly comprising: a first top channel member and a second top channel member each having a plurality of mounting holes for mounting said channels to the frame of the towing vehicle; a top width adjusting plate attached to and perpendicular to each top channel member for maintaining a spaced relationship between the frame of the towing vehicle with said top channel members, said top width adjusting plate having a plurality of adjustment holes; an upper height adjusting plate attached to and perpendicular to each top channel member, said upper height adjusting plate having a plurality of adjustment holes; a first bottom channel member and a second bottom channel member each having a plurality of adjustment holes; a lower height adjusting plate attached to and perpendicular to each bottom channel member, said lower height adjusting plate having a plurality of holes spaced to align with the holes in the upper height adjusting plate, said upper and lower height adjusting plates are connected by a plurality of bolts through the holes in the said upper and lower adjusting plates; a bottom width adjusting plate attached to and perpendicular to each bottom channel member for maintaining a spaced relationship between each bottom channel member; a pivot saddle mounted on each bottom channel and adapted to receive the fifth wheel trailer hitch; a lock pin attached to each pivot saddle; and a king pin adaptor assembly comprising: a king pin with an extension plate; a first hitch rail and a second hitch rail, each of said hitch rails having a first and second end; an extension channel attached to the extension plate and the first end of each hitch rail by a brace member attached to each of said hitch rails and said extension channel; a ball plate adjustably attached to and traverse to the first hitch rail and the second hitch rail at a point to engage a trailer ball hitch mechanism of the trailer; a means for attaching the second end of each of said hitch rails to the trailer tongue of the trailer, whereby the king pin of the king pin adaptor assembly attached to the trailer engages the fifth wheel trailer hitch mounted in the opening of the cradle assembly attached to the towing vehicle.

2. A fifth wheel trailer hitch assembly of claim 1 wherein each hitch rail includes a means for pivotly hinging each hitch rail in front of the trailer ball hitch mechanism on the trailer and a locking means for locking each hitch rail in a position.

3. A fifth wheel trailer hitch assembly of claim 1 wherein the means for attaching the king pin adaptor assembly is adapted to connect to a single straight tongue on a trailer.

4. A fifth wheel trailer hitch assembly of claim 1 wherein the means for attaching the king pin adaptor assembly is adapted to connect to an A-frame tongue on a trailer.

* * * * *